(12) United States Patent
Krahl

(10) Patent No.: US 8,695,672 B2
(45) Date of Patent: Apr. 15, 2014

(54) SEALING ELEMENT FOR PRODUCING SMOOTH STAMPING FIELDS DURING THE SEALING OF PLASTIC SHEETS

(75) Inventor: Wolfgang Krahl, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 330 days.

(21) Appl. No.: 13/302,301

(22) Filed: Nov. 22, 2011

(65) Prior Publication Data

US 2012/0132371 A1 May 31, 2012

(30) Foreign Application Priority Data

Nov. 26, 2010 (EP) ..................................... 10192789

(51) Int. Cl.
*B32B 37/00* (2006.01)

(52) U.S. Cl.
USPC .......................................... 156/581; 156/580

(58) Field of Classification Search
USPC ................... 156/228, 580, 581, 583.1, 583.4;
100/315, 321, 326; 53/370.7, 371.2,
53/373.7, 374.2
See application file for complete search history.

(56) References Cited

U.S. PATENT DOCUMENTS

| | | | |
|---|---|---|---|
| 4,444,614 A | 4/1984 | Krayer | |
| 5,868,901 A * | 2/1999 | Smith | 156/582 |
| 5,937,615 A * | 8/1999 | Forman | 53/133.4 |
| 6,612,096 B1 | 9/2003 | Romijn | |
| 7,174,699 B1 * | 2/2007 | Wyman et al. | 53/547 |

FOREIGN PATENT DOCUMENTS

| | | |
|---|---|---|
| DE | 4420808 A1 | 12/1995 |
| DE | 102006010023 B3 | 9/2007 |
| GB | 1246653 | 9/1971 |

OTHER PUBLICATIONS

EP Search Report for EP 10192789.
I. Caron: "Expanded hole method for arresting crack propagation: residual stress determination using neutron diffraction". Physica B: Condensed Matter Proceedings of the Third European Conference on Neutron Scattering, Bd. vol. 350, Issues 1-3, Supplement 1. Jul. 15, 2004. pp. E503-E505, XP002631298.

* cited by examiner

*Primary Examiner* — James Sells
(74) *Attorney, Agent, or Firm* — Brinks Gilson & Lione

(57) ABSTRACT

The sealing element for integration into a sealing tool for producing smooth stamping fields during the sealing of two plastic sheets has a base body. A first slot extends into the base body from a first narrow lateral surface, and a second slot, which is offset vertically from the first slot, extends into the base body from a second narrow lateral surface, in such a way that the two slots define a section of the base body which has substantially the shape of an S or reversed S. The first slot has a U-shape with a first leg of the first slot being longer than a second leg of the first slot, and the second slot has a U-shape with a first leg of the second slot being longer than a second leg of the second slot. Each of the two slots expands at its inner end to form a bore.

15 Claims, 2 Drawing Sheets

SEALING ELEMENT FOR PRODUCING SMOOTH STAMPING FIELDS DURING THE SEALING OF PLASTIC SHEETS

RELATED APPLICATIONS

The present patent document claims the benefit of priority to European Patent Application No. EP 10192789.5, filed Nov. 26, 2010, and entitled "SEALING ELEMENT FOR PRODUCING SMOOTH STAMPING FIELDS DURING THE SEALING OF PLASTIC SHEETS," the entire contents of each of which are incorporated herein by reference.

FIELD AND BACKGROUND

The present invention relates to a sealing element for producing smooth stamping fields during the sealing of two plastic sheets.

During the production of blister packs, especially in the pharmaceutical industry, a forming sheet with molded-in pockets, into which the products are placed, is produced first. Then, in a sealing station of a thermoforming machine, a cover sheet is sealed to the forming sheet in the areas outside the pockets. The sealing station can be operated continuously with sealing rolls rolling against each other or discontinuously with opposing sealing plates. After the two plastic sheets have been sealed together, it is often necessary to stamp lot numbers or other information in a targeted and indelible manner on the blister band which has been produced. So that the mechanically stamped information can be read more easily, the area required to accept it, namely, the coding or stamping field, is not sealed with two conventional sealing tools, because the ripples on the surface of the sealing tools would produce waviness in the cover sheet. Instead, one of the two sealing tools contains, in the area of the desired stamping field, a sealing element, which is introduced into a recess in the sealing tool and supported there by a spring mechanism. Because the spring is subjected to constant loading, however, it undergoes heavy wear, and the spring characteristic can also change as a result.

To reduce the susceptibility of the sealing element, a spring mechanism integrated into the sealing element has been proposed in DE 10 2006 010 023 B3. For this purpose, two slots are provided in the sealing element. The slots are offset from each other vertically and extend into the opposite sides of the base body of the sealing element. Between them a thin bending beam is formed, which can be deformed elastically under mechanical pressure. Even with these types of sealing elements, however, it is impossible to prevent wear from occurring as a result of material fatigue, and in particular these types of sealing elements can be plastically deformed and thus destroyed when they are subjected to excessive pressure as a result of operating error.

BRIEF SUMMARY

It is an object of the present invention to provide a sealing element for producing smooth stamping fields during the sealing of two plastic sheets together. Such sealing element should also be characterized by long life fatigue strength and be resistant to all types of operating errors.

According to an aspect of the invention, the sealing element for integration into a sealing tool for producing smooth stamping fields during the sealing of two plastic sheets together comprises a base body, which comprises an upper surface, a lower surface for exerting a sealing force on the plastic sheets, two opposing narrow lateral surfaces, and two opposing wide lateral surfaces. In addition, a first slot and a second slot are formed in the base body. These slots form a spring element, wherein the first slot extends into the base body from a first narrow lateral surface, and wherein the second slot, which is offset vertically from the first slot, extends into the base body from a second narrow lateral surface in such a way that the two slots define a section of the base body which comprises substantially the shape of an S or reversed S. Each of the two slots expands at its inner end to form a bore. To construct a multi-layer spring element, the slots are designed with a U-shape, wherein a first leg of each slot is longer than the second leg of the slot.

Because of this design, the sealing element is especially resistant to stress and cannot be destroyed even when an operating error occurs.

The slots preferably are not too large in the vertical direction. The height of the slots defines the maximum travel of the spring, which does not have to be very large in the case of the present application. Conversely, slots of limited height provide a sufficiently large amount of spring stiffness.

To distribute the force of the spring uniformly over the sheets to be sealed, the slots pass all the way through the base body in a transverse direction from a first wide lateral surface to a second wide lateral surface.

To achieve maximum spring force while simultaneously minimizing the material stress in the base body, the two second legs are arranged between the two first legs; the bore of the first slot is arranged within the U-shape of the second slot, opposite the arc area of the second slot; and the bore of the second slot is arranged within the U-shape of the first slot, opposite the arc area of the first slot. In this way, the material stress generated by compression of the spring arrangement is transmitted over a large surface in the area of the S-shape, primarily into the arc sections of the base body.

The sealing element is preferably made of high-grade steel. Stress peaks are thus avoided, and the material is not subjected to critical loads.

To achieve sufficient sealing pressure, the ratio of the distance between the two narrow lateral surfaces to the distance between the upper surface and the lower surface is usually not more than 1.8:1, preferably not more than 1.5:1.

On the vertical center axis, the height of the bores, which are oval or preferably circular, is considerably greater than the height of the slots, such as 3-10 times greater, and preferably 5-8 times greater. On the horizontal center axis, the width of the bores is identical to their height in the case of circular bores and not far away from this value in the case of oval bores. As a result, the stresses in the material are distributed over a wide area, while unallowable stress peaks are avoided at the same time.

To achieve a longer stamping field, a sealing structure with at least two sealing elements, which are connected integrally to each other, can be used, wherein the two facing narrow lateral surfaces of the sealing elements extend over only a portion of the height of the sealing elements and are a certain distance away from each other, and wherein the sealing elements are connected to each other by a web, which is formed underneath these facing narrow lateral surfaces of the sealing elements.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
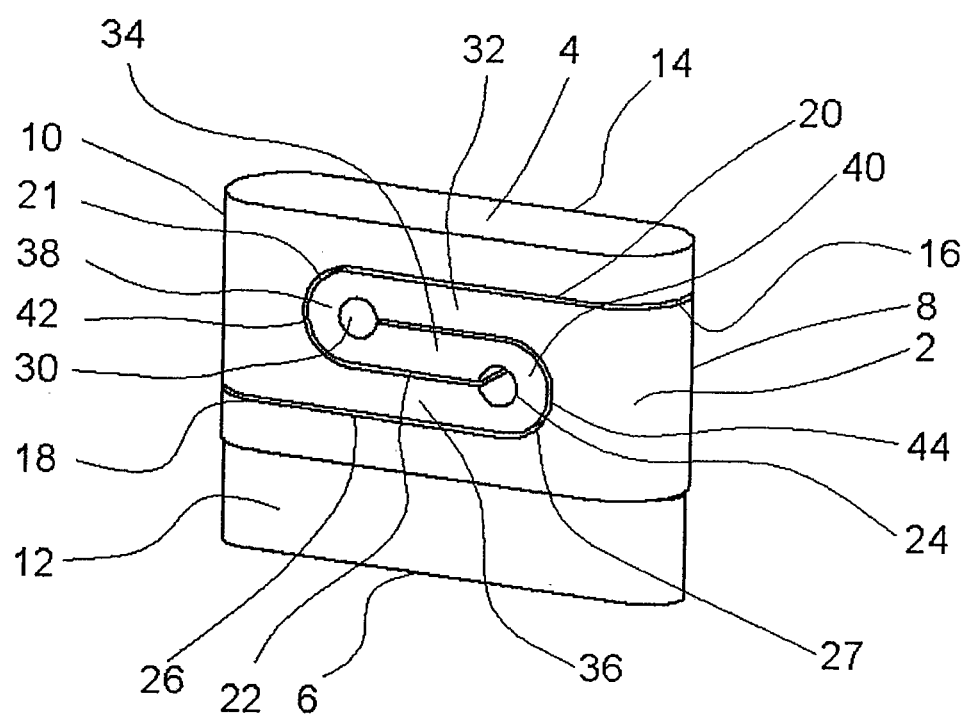
FIG. 1 is a perspective view of one embodiment of the sealing element according to the present invention.

FIG. 1 shows an embodiment of the sealing element 1 according to the present invention. The sealing element 1 is designed to be inserted into a recess in a sealing tool (not shown), so that, during the sealing of two plastic sheets to each other in a sealing station, a smooth stamping field can be produced. For this purpose, a certain force is required, which is exerted by an integrated spring element, as will be described in greater detail in the following.

The sealing element comprises a base body 2 with an upper surface 4, which is received in a recess in the sealing tool and which is supported by a web of the sealing tool itself or by a sealing tool holder. The upper surface 4 lies opposite a lower surface 6 of the sealing element 1, which is smooth and which is intended to apply a sealing force to the plastic sheets to be sealed. The base body 2 also comprises two opposing narrow lateral surfaces 8, 10 and two opposing wide lateral surfaces 12, 14.

The material of the base body 2 is usually high-grade steel, but spring steel can also be appropriate for certain applications. The base body 2 normally has a length of 50-100 mm, a width of 3-10 mm, and a height of 11-50 mm. Overall, the ratio of the distance between the two narrow lateral surfaces 8, 10 to the distance between the upper surface 4 and the lower surface 6 should not exceed 1.8:1 and preferably should not exceed 1.5:1.

To form an integrated spring element, a first slot 16 and a second slot 18 are formed in the base body 2. The first slot 16 extends into the base body 2 from the first narrow lateral surface 8, and the second slot 18, which is offset vertically from the first slot 16, extends into the base body 2 from the second narrow lateral surface 10.

The two slots 16, 18 pass all the way through the base body 2 in a transverse direction from the first wide lateral surface 12 to the second wide lateral surface 14, but their height in the vertical direction is relatively limited, preferably in the range of 0.3-0.5 mm. The maximum deformation of the spring element in the vertical direction is limited by the vertical dimensions of the slots 16, 18. The first slot 16 is U-shaped and comprises a longer first leg 20 and a shorter second leg 22. The first leg 20 extends into the base body in a substantially horizontal direction from the first narrow lateral surface 8, until, at a point approximately 60-90%, and preferably 70-80%, along the length of the base body 2, it curves downward in an arc area 21 and then continues as the second leg 22. The distance between the first leg 20 and the second leg 22 is usually in the range of 2-5 mm.

The first slot 16 expands at its inner end to form a bore 24. This bore 24 is oval or preferably circular and has a height on its vertical center axis which is 3-10 times, and preferably 5-8 times, the height of the first slot 16. The width of the bore 24 on its horizontal center axis is identical to its height in the case of a circular bore 24 or, in the case of an oval bore, not far away from that value.

Vertically offset from the first slot 16, the first leg 26 of the second slot 18 extends into the base body 2 from the second narrow lateral surface 10 in the direction opposite that of the first slot 16 and then curves upward in an arc area 27, continuing from there as the shorter second leg 28. Ideally, the dimensions of the first slot 16 and those of the second slot 18 are identical.

The second slot 18 also has a bore 30 of larger diameter at the inner end of the second leg 28 of the slot 18. The dimensions of the bore 30 are preferably the same as those of the bore 24.

Because the two slots 16, 18 are U-shaped and their second legs 22, 28 are shorter, the slots can be arranged so that the two second legs 22, 28 extend between the two first legs 20, 26, which means that the two U-shapes are thus nested in each other. In this case, the bore 24 of the first slot 16 lies within the U-shape of the second slot 18, opposite the arc area 27 of the second slot 18, and the bore 30 of the second slot 18 lies within the U-shape of the first slot 16, opposite the arc area 21 of the first slot 16. The slots 16, 18 are therefore designed so that the spring element works like a torsion spring, and they define a section of the base body 2 which comprises substantially the shape of an S or reversed S. This section is formed by three substantially horizontal webs 32, 34, 36, which ideally have the same material thickness (preferably in the range of 2-5 mm) and do not act as bending beams. The three horizontal webs 32, 34, 36 of the base body 2 are connected by arc sections 38, 40.

By means of an arrangement of this type, the stress which develops in the sealing element 1 when pressure is exerted is reduced; the stress is distributed over a large area of the sealing element 1, while at the same time a certain stiffness is maintained.

It has been found to be optimal for the arc sections 38, 40, which connect the three horizontal webs 32, 34, 36 of the base body 2 in the area of the S-shaped or reversed S-shaped section of the base body 2, not to be precisely concentric with respect to the associated bore 24, 30. It is preferable instead for the distance between the outer edge of the bore 24 of the first slot 16 and the first leg 26 of the second slot 18 to be smaller than the distance between the outer edge of the bore 24 and the apex 44 of the second slot 18, and for the distance between the outer edge of the bore 24 of the first slot 16 and the second leg 28 of the second slot 18 to be smaller than the distance between the outer edge of the bore 24 and the apex 44 of the second slot 18.

Because of the desired symmetry, it is preferable by the same token for the distance between the outer edge of the bore 30 of the second slot 18 and the first leg 20 of the first slot 16 to be smaller than the distance between the outer edge of the bore 30 and the apex 42 of the first slot 16, and for the distance between the outer edge of the bore 30 of the second slot 18 and the second leg 22 of the first slot 16 to be smaller than the distance between the outer edge of the bore 30 and the apex 42 of the first slot 16.

The distances between the outer edge of the bore 24, 30 in question and each of its two associated legs 20, 22, 26, 28 are preferably the same.

There are many different ways in which the design shown in FIG. 1 can be varied.

The geometry, the dimensions, the radii of curvature, and the diameters of the individual elements discussed above, especially as they pertain to the slots, 16, 18, the bores 24, 30, and the webs 32, 34, 36 with the two arc sections 38, 40 of the base body 2, can undergo many different modifications. The important point is that the spring constant required to ensure the satisfactory functioning of the device must always remains preserved.

As already explained, in the case of the embodiment shown in FIG. 1, the greatest stress on the two arc sections 38, 40 of the base body 2 is absorbed in the area of the S-shaped section. The contour of the torsion springs can be adjusted by varying the bores 24, 30 and their positioning.

Figure 2:
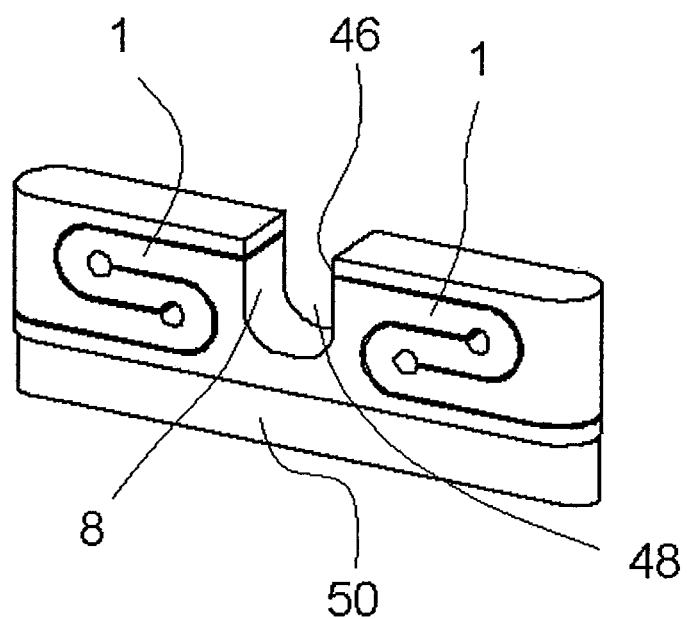
FIG. 2 shows a sealing structure consisting of two sealing elements according to the present invention connected integrally to each other.

To produce a very long stamping field, a sealing structure according to FIG. 2 can be used. This sealing structure has two sealing elements 1 as described above connected integrally to each other. The two facing narrow lateral surfaces 8, 46 of the sealing elements 1 extend only over a portion of the height of the sealing elements 1 and are separated from each other by a recess 48. The sealing elements 1 are connected to each other by a web 50, which is formed underneath the facing narrow lateral surfaces 8, 46 of the sealing elements 1. In the case of a sealing structure of this type, it is advantageous for the two sealing elements 1 to be symmetric with respect to the center axis of the sealing structure. It is also conceivable that more than two sealing elements 1 could be connected together in one sealing structure.

The invention claimed is:

1. A sealing element for integration into a sealing tool for producing smooth stamping fields during the sealing of two plastic sheets, the sealing element comprising:
   a base body comprising an upper surface, a lower surface for exerting a sealing force on the plastic sheets, two opposing narrow lateral surfaces and two opposing wide lateral surfaces,
   a first slot and a second slot formed in the base body to form a spring element, wherein the first slot extends into the base body from a first narrow lateral surface and the second slot, which is offset vertically from the first slot, extends into the base body from a second narrow lateral surface in such a way that the first and second slots define a section of the base body which comprises substantially the shape of an S or reversed S,
   wherein the first slot has a U-shape with a first leg of the first slot being longer than a second leg of the first slot, and the second slot has a U-shape with a first leg of the second slot being longer than a second leg of the second slot, and
   wherein each of the first and second slots expands at its inner end to form a bore.

2. The sealing element of claim 1, wherein a size of the first and second slots is limited in a vertical direction.

3. The sealing element of claim 1, wherein the first and second slots pass all the way through the base body in a transverse direction from a first wide lateral surface to a second wide lateral surface.

4. The sealing element of claim 1, wherein the two second legs of the first and second slots are arranged between the two first legs of the first and second slots, and wherein the bore of the first slot lies within the U-shape of the second slot, opposite an arc area of the second slot, and where the bore of the second slot lies within the U-shape of the first slot, opposite an arc area of the first slot.

5. The sealing element of claim 4, wherein a distance between an outer edge of the bore of the first slot and the first leg of the second slot is smaller than the distance between the outer edge of the bore of the first slot and an apex of the second slot, and wherein a distance between an outer edge of the bore of the first slot and the second leg of the second slot is smaller than a distance between the outer edge of the bore of the first slot and an apex of the second slot.

6. The sealing element of claim 5, wherein a distance between the outer edge of the bore of the first slot and the first leg of the second slot is equal to a distance between the outer edge of the bore of the first slot and the second leg of the second slot.

7. The sealing element of claim 5, wherein a distance between an outer edge of the bore of the second slot and the first leg of the first slot is smaller than a distance between the outer edge of the bore of the second slot and an apex of the first slot, and wherein a distance between the outer edge of the bore of the second slot and the second leg of the first slot is smaller than a distance between the outer edge of the bore of the second slot and an apex of the first slot.

8. The sealing element of claim 7, wherein a distance between the outer edge of the bore of the second slot and the first leg of the first slot is equal to a distance between the outer edge of the bore of the second slot and the second leg of the first slot.

9. The sealing element of claim 1, wherein it is made of high-grade steel.

10. The sealing element of claim 1, wherein a ratio of the distance between the two narrow lateral surfaces to the distance between the upper surface and the lower surface is not greater than 1.8:1.

11. The sealing element of claim 10, wherein the ratio of the distance between the two narrow lateral surfaces to the distance between the upper surface and the lower surface is not greater than 1.5:1.

12. The sealing element of claim 1, wherein the bores of the first and second slots comprise an oval cross section.

13. The sealing element of claim 1, wherein the bores of the first and second slots comprise a circular cross section.

14. The sealing element of claim 13, wherein a height of the bores is 3-10 times greater than a height of the first and second slots.

15. The sealing element of claim 14, wherein the height of the bores is 5-8 times greater than the height of the first and second slots.

* * * * *